United States Patent
Kawaguchi et al.

[11] Patent Number: 6,123,514
[45] Date of Patent: Sep. 26, 2000

[54] SEALING STRUCTURE FOR COMPRESSORS

[75] Inventors: Masahiro Kawaguchi; Hiroshi Kubo; Tomohiko Yokono; Shintaro Miura; Takuya Okuno; Eiji Tokunaga; Atsuyuki Morishita; Ken Suitou, all of Kariya, Japan

[73] Assignee: Kabushiki Kaisha Toyoda Jidoshokki Seisakushi, Aichi-Ken, Japan

[21] Appl. No.: 09/043,081

[22] PCT Filed: Jul. 16, 1997

[86] PCT No.: PCT/JP97/02465

§ 371 Date: May 26, 1998

§ 102(e) Date: May 26, 1998

[87] PCT Pub. No.: WO98/02681

PCT Pub. Date: Jan. 22, 1998

[30] Foreign Application Priority Data

Jul. 17, 1996 [JP] Japan .................................. 8-187509
Jan. 24, 1997 [JP] Japan .................................. 9-011198

[51] Int. Cl.[7] ...................................................... F04B 1/26
[52] U.S. Cl. ...................... 417/222.2; 277/559; 277/560; 277/564; 277/565
[58] Field of Search ................................ 92/71; 417/269, 417/222.2; 277/570, 569, 565, 564, 560, 559

[56] References Cited

U.S. PATENT DOCUMENTS

| 4,132,421 | 1/1979 | Corsi et al. | 277/565 |
| 4,822,059 | 4/1989 | Shimasaki et al. | 277/564 |
| 4,834,397 | 5/1989 | Shimasaki et al. | 277/564 |
| 4,848,776 | 7/1989 | Winckler | 277/349 |
| 5,052,696 | 10/1991 | Hatch | 277/562 |
| 5,209,502 | 5/1993 | Savoia | 277/562 |
| 5,713,725 | 2/1998 | Kawaguchi et al. | 417/222.2 |
| 5,860,656 | 1/1999 | Obata et al. | 277/559 |

FOREIGN PATENT DOCUMENTS

| 63-312569 | 12/1988 | Japan . |
| 2-47311 | 12/1990 | Japan . |
| 3-41264 | 4/1991 | Japan . |
| 5-149442 | 6/1993 | Japan . |
| 6-300142 | 10/1994 | Japan . |
| 7-1552 | 1/1995 | Japan . |
| 7-305775 | 11/1995 | Japan . |

*Primary Examiner*—Timothy S. Thorpe
*Assistant Examiner*—David J. Torrente
*Attorney, Agent, or Firm*—Morgan & Finnegan, L.L.P.

[57] ABSTRACT

A sealing structure for the shaft of a compressor. The sealing apparatus includes an inner ring, and outer ring, and a support ring. The inner ring and the outer rings have flexible annular lips that contact the surface of the rotary shaft. The support ring supports the inner lip and determines the position of the inner lip. The first lip permits fluid leakage along the surface of the shaft, while the second lip forms a fluid-tight seal with the shaft. The support ring prevents the internal pressure of the compressor from pressing the first lip against the shaft with excessive force, which extends the life of the sealing apparatus.

22 Claims, 5 Drawing Sheets

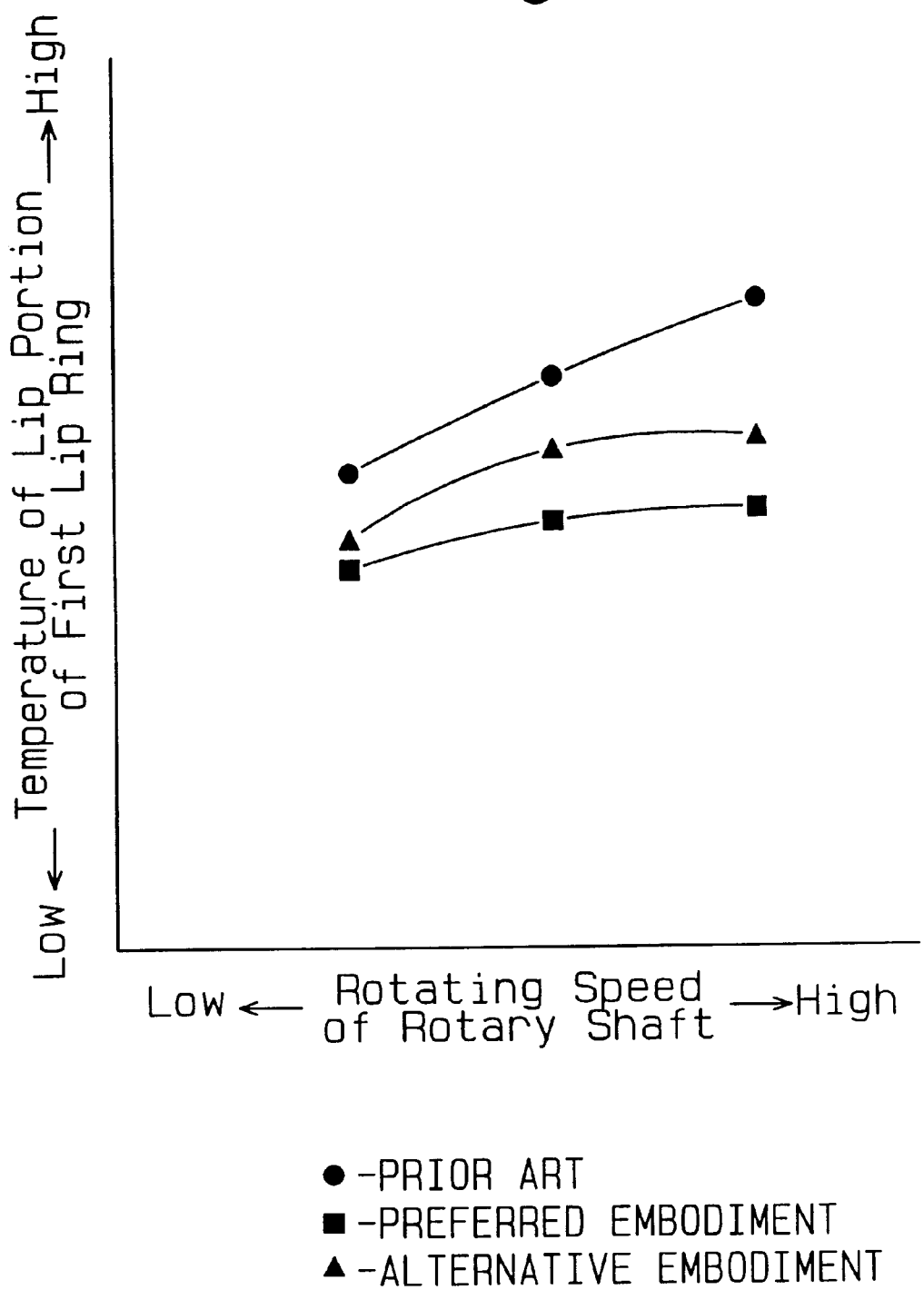

SEALING STRUCTURE FOR COMPRESSORS

BACKGROUND OF THE INVENTION

The present invention relates to compressors that perform compression by rotating a rotary shaft with the power of an external drive source, and more particularly, to a sealing structure that seals about the rotary shaft to prevent fluids such as refrigerant and lubricating oil in the compressor interior, or high pressure zone, from leaking out to the compressor exterior, or low pressure zone.

Japanese Unexamined Patent Publication No. 6-300142 discloses an example of a sealing apparatus incorporated in a compressor to seal about a rotary shaft of the compressor. As shown in FIG. 7, the sealing apparatus is provided with a rubber first lip ring 91 and a second fluororesin second lip ring 2, which is arranged toward the outer side of the compressor with respect to the first lip ring 91. The first lip ring 91 and the second lip ring 92 respectively have lip portions 911, 921 that contact the outer surface 931 of a rotary shaft 93 to prevent leakage of fluid when the rotary shaft 93 is rotated or stopped.

The lip portion 911 of the first lip ring 91 permits leakage of fluid toward the second lip ring 92 during rotation of the rotary shaft 93. The fluid leaking from the lip portion 911 (mainly lubricating oil) lubricates the lip portions 911, 921 to prevent frictional deterioration and thermal deterioration caused by high temperatures. This increases the durability of the lip portions 911, 921.

It is significant that the contacting posture of the lip portion 911 with respect to the peripheral surface 931 of the rotary shaft 93 be set and maintained at an optimal state to prevent the leakage of fluid when stopping the rotation of the rotary shaft 93 while permitting leakage when rotating the rotary shaft 93, as described above. In the sealing apparatus of the above publication, the second lip ring 92 is adhered to the first lip ring 91. The contacting posture of the lip portion 911 with respect to the peripheral surface 931 of the rotary shaft 93 is maintained by the support of the second lip ring 92.

However, when the pressure in the compressor becomes high, the first lip ring 91, which is urged by the force of the high pressure, presses the lip portion 921 against the rotary shaft 93 with excessive force. This raises the temperature of the lip portion 921 and the temperature about the lip portion 921. As a result, the heated lip portion 921 affects the rubber lip portion 911, which has inferior heat resistance in comparison to fluororesin, and causes thermal deterioration.

Accordingly, it is an objective of the present invention to provide a compressor sealing structure that suppresses the deterioration of the lip portion of the first lip ring and that has superior durability.

SUMMARY OF THE INVENTION

In the sealing apparatus according to the present invention, a posture maintaining member is arranged between a first lip ring and a second lip ring to support a contacting posture of a lip portion of a first lip ring with respect to the outer surface of the rotary shaft. In this manner, the contacting posture of the lip portion of the first lip ring is maintained by an exclusive posture maintaining member. Accordingly, when the pressure in a crank chamber is high, the first lip ring is prevented from pressing a lip portion of the second lip ring against the outer surface of the rotary shaft with excessive force. As a result, excessive heating of the lip portion of the second lip ring is prevented. Thus, thermal deterioration that would be caused by the heating is prevented.

The contacting posture of the lip portion of the first lip ring with respect to the outer surface of the rotary shaft is arranged so that fluid does not leak toward the second lip ring during rotation of the rotary shaft. Accordingly, the fluid leakage optimally lubricates the lip portions of the first lip ring and the second lip ring and prevents frictional deterioration and thermal deterioration of the lip portion.

The lip portion of the first lip ring has a distal portion that includes an acute flare projecting in a radially inward direction. The lip portion of the first lip ring contacts the outer surface of the rotary shaft along an annular region of the outer surface with a distal end of the flare. The contacting posture of the lip portion of the first lip ring with respect to the outer surface of the rotary shaft is arranged so that an angle of an inclined surface defining the inner side of the flare with respect to the outer surface of the rotary shaft is smaller than an angle of an inclined surface defining the outer side of the flare with respect to the outer surface of the rotary shaft. Accordingly, the lip portion of the first lip ring is provided with sufficient sealing capability when the rotation of the rotary shaft is stopped and permits leakage of a large amount of fluid when the rotary shaft is rotated. As a result, the lubrication of the first lip ring and the second lip ring with the fluid leakage is satisfactory. This effectively prevents frictional deterioration and thermal deterioration of the lip portion.

Space is provided between the posture maintaining member and the lip portion of the second lip ring. Accordingly, when the pressure in the crank chamber is high, the load acting on the first lip ring is received by the posture maintaining member and not transmitted to the lip portion of the second lip ring. As a result, heating of the lip portion of the second lip ring is suppressed.

A pump structure actuated by the rotation of the rotary shaft is provided in a contact zone between the lip portion of the second lip ring and the outer surface of the rotary shaft. The pump structure forces fluid in the contact zone between the lip portion of the second lip ring and the outer surface of the rotary shaft toward the inside of the compressor. Accordingly, the sealing capability of the lip portion of the second lip ring is enhanced. As a result, the sealing capability of the entire sealing apparatus is not degraded despite the fact that the structure is such that fluid leaks from the lip portion of the first lip ring during rotation of the rotary shaft.

The pump structure includes a pump groove defined in at least one of the lip portion of the second lip ring and the outer surface of the rotary shaft. The pump groove is provided only in a section located toward the inside of the compressor in the contact zone between the lip portion of the second lip ring and the outer surface of the rotary shaft and not in a section located toward the outside of the compressor. That is, the pump groove is arranged so that it is not opened toward the outside of the compressor. Accordingly, the residual fluid in the pump groove does not flow out of the compressor when the rotation of the rotary shaft is stopped. As a result, the sealing capability of the sealing structure when the rotation of the rotary shaft is stopped is enhanced.

The pump groove extends spirally about the axis of the second lip ring. Accordingly, a spiral pump effect is produced between the pump groove and the outer surface of the rotary shaft during rotation of the rotary shaft.

The compressor includes a crank chamber and a cylinder bore that function as the inside of the compressor. A cam plate accommodated in the crank chamber is integrally rotatable with the rotary shaft and is inclinable. A piston is reciprocally accommodated in the cylinder bore. The pressure of the crank chamber is altered to change the difference between the pressure of the crank chamber and the pressure of the cylinder bore and vary the inclination of the cam plate to control displacement. Accordingly, the pressure of the crank chamber becomes high to minimize displacement. The advantages of the above sealing structure are effectively obtained, especially when applied to a compressor that withstands such harsh conditions.

The compressor is provided with a refrigerant circulation impeding means for impeding the circulation of refrigerant in an external refrigerant circuit in cooperation with a minimum inclination of the cam plate. The rotary shaft never stops rotating. The advantages of the above sealing structure are effectively obtained, especially when applied to a compressor that withstands such harsh conditions.

The compressor includes a fluid circulation passage defined in the inside of the compressor extending through a discharge pressure zone, the crank chamber, a suction pressure zone, and the cylinder bore when the refrigerant circulation impeding means impedes refrigerant circulation in the external refrigerant circuit. A passage constituting the circulation passage connects the crank chamber with the suction pressure zone and has an opening located in the crank chamber at the vicinity of the first lip ring. Accordingly, the amount of fluid flowing in the vicinity of the first lip ring in the crank chamber becomes large during minimum inclination operation, which produces harsh conditions for the lip portion of the first lip ring. As a result, the amount of fluid necessary for lubricating the lip portions of the first lip ring and the second lip ring leaks continuously. This positively lubricates the lip portion.

BRIEF DESCRIPTION OF THE DRAWINGS

FIG. 5 is a graph comparing the effects of the sealing apparatus of the preferred embodiment with that of the sealing apparatus of Japanese Unexamined Patent Publication No. 6-300142, where the vertical axis indicates the temperature of the lip portion of the first lip ring, while the horizontal axis indicates the rotating speed of the rotary shaft;

DETAILED DESCRIPTION OF THE PREFERRED EMBODIMENTS

First Embodiment

A first embodiment according to the present invention will now be described with reference to FIG. 1 to FIG. 5.

Figure 1:
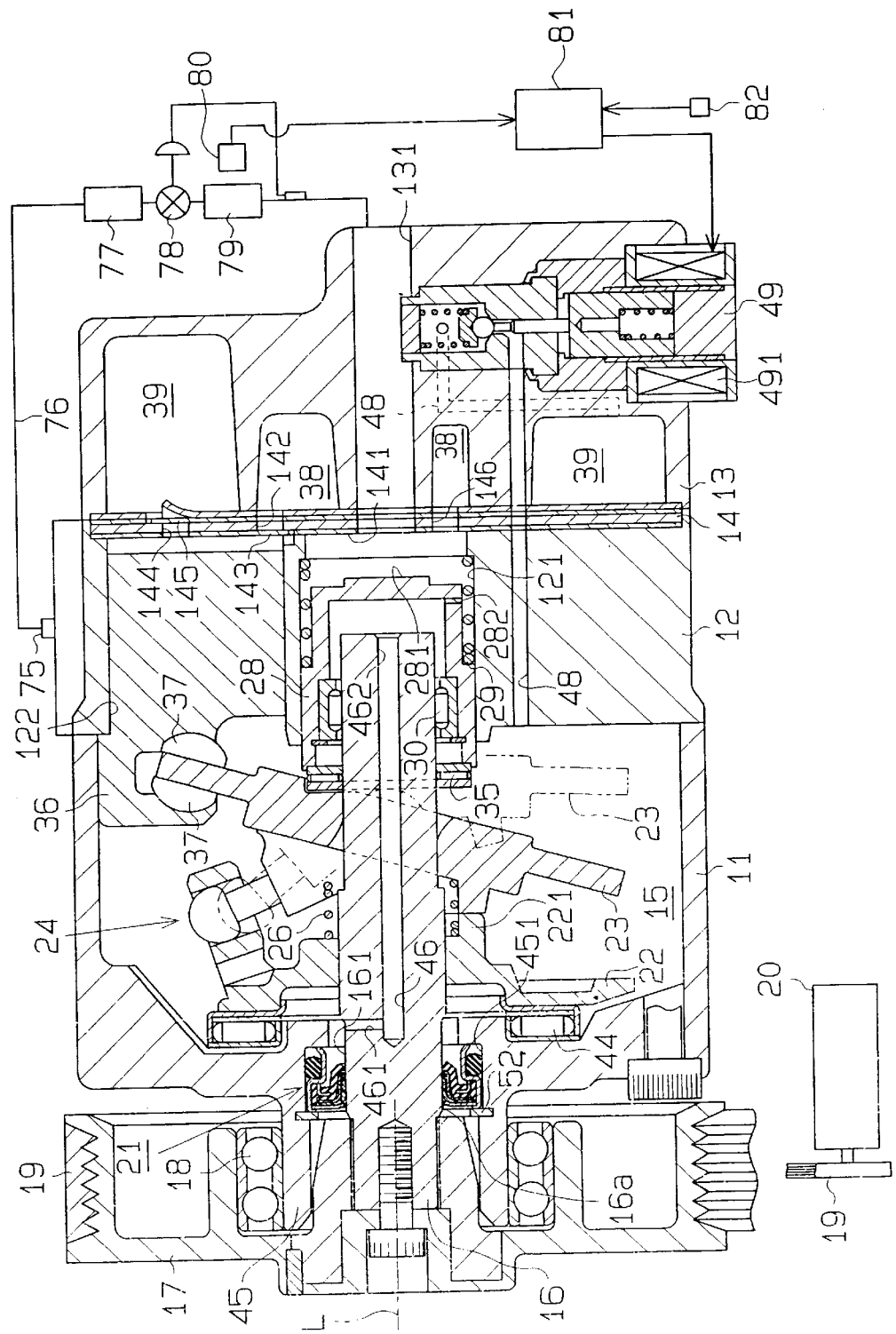
FIG. 1 is a cross-sectional view showing a clutchless type variable displacement compressor to which a first embodiment of a sealing apparatus according to the present invention is applied.

As shown in FIG. 1, a front housing 11 is coupled to the front end of a cylinder block 12. A rear housing 13 is fixed to the rear end of the cylinder block 12 with a valve body 14 arranged in between. A crank chamber 15 is defined in the front housing 11 and the cylinder block 12. A rotary shaft 16 is rotatably supported by the front housing 11 and the cylinder block 12 extending through the crank chamber 15. One end of the rotary shaft 16 extends through the front wall of the front housing 11 and projects outward.

A boss 45 projects from the front wall of the front housing 11 and surrounds the projecting end of the rotary shaft 16. A pulley 17 is rotatably supported by an angular bearing 18 on the peripheral surface of the boss 45. The pulley 17 is connected to the end of the rotary shaft 16 projecting from the front housing 11. A belt 19 engaged with the peripheral portion of the pulley 17 directly connects the pulley 17 with a vehicle engine 20, serving as an external drive force, without using an electromagnetic clutch or the like, which is expensive and heavy and which produces shock when actuated or de-actuated. Accordingly, the rotary shaft 16 is always rotated when the engine 20 is running.

A sealing apparatus 21 that seals the rotary shaft 16 is arranged between an outer surface 161 of the rotary shaft 16 at the projecting end and the inner surface 451 of the boss portion 45. The structure of the sealing apparatus 21 will be described in detail later.

A rotary support 22 is fixed to the rotary shaft 16 in the crank chamber 15. A swash plate 23, serving as a cam plate, is supported in a manner that it is slidable and inclinable with respect to the direction of the axis L of the rotary shaft 16. A hinge mechanism 24 is arranged between the rotary support 22 and the swash plate 23. The hinge mechanism 24 enables the swash plate 23 to incline with respect to the axis L of the rotary shaft 16 while rotating integrally with the rotary shaft 16. When the center portion of the swash plate 23 moves toward the cylinder block 12, the inclination of the swash plate 23 decreases. An inclination decreasing spring 26 is arranged between the rotary support 22 and the swash plate 23. The inclination decreasing spring 26 urges the swash plate 23 in a direction that decreases the inclination. An inclination restricting projection 221 is defined in the rear surface of the rotary support 22 to restrict the maximum inclination of the swash plate 23 when abutting the swash plate 23.

An accommodating bore 121 extends through the center of the cylinder block 12. A cylindrical shutter 28, which constitutes a refrigerant circulation impeding means, is slidably accommodated in the accommodating bore 121. A suction passage opening spring 29 is arranged between the end surface of the accommodating bore 121 and the shutter 28 to urge the shutter 28 toward the swash plate 23.

The rear end of the rotary shaft 16 is inserted into the shutter 28. A radial bearing 30 is arranged between the rear end of the rotary shaft 16 and the inner surface of the shutter 28. The radial bearing 30 slides together with the shutter 28 in the direction of the axis L with respect to the rotary shaft 16.

A suction passage 131 extends through the center of the rear housing 13 and the valve body 14. The suction passage 131 is connected with the accommodating bore 121. A positioning surface 141 is defined about the outlet of the suction passage 131 on the front surface of the valve body 14. A shutting surface 281 is defined on the distal surface of the shutter 28. The shutting surface 281 contacts or moves away from the positioning surface 141 in accordance with the movement of the shutter 28. The abutment between the shutting surface 281 and the positioning surface 141 seals the space in between and disconnects the suction passage 131 from the interior space of the accommodating bore 121.

A thrust bearing 35 is arranged between the swash plate 23 and the shutter 28 and slidably supported on the rotary shaft 16. The thrust bearing 35 is urged by the suction passage opening spring 29 so that it is always held between the swash plate 23 and the shutter 28.

During inclination of the swash plate 23 toward the shutter 28, the inclination of the swash plate 23 is transmitted to the shutter 28 by the thrust bearing 35. Thus, the shutter 28 moves toward the positioning surface 141 against the urging force of the suction passage opening spring 29. This abuts the shutting surface 281 of the shutter 28 against the positioning surface 141. With the shutting surface 281 against the positioning surface 141, further inclination of the swash plate 23 is restricted. In the restricted state, the swash plate 23 is arranged at the minimum inclination, which is slightly greater than zero degrees (as measured from a plane normal to the axis L).

Cylinder bores 122 extend through the cylinder block 12. A single-headed piston 36 is accommodated in each cylinder bore 122. Each piston 36 is coupled to the peripheral portion of the swash plate 23 by shoes 37 to convert the rotational movement of the swash plate 23 to forward and reverse reciprocation of the piston 36.

A suction chamber 38, which is in a suction pressure zone, and a discharge chamber 39, which is in a discharge pressure zone, are each defined in the rear housing 13. Suction ports 142, suction flaps 143 for opening and closing the suction ports 142, discharge ports 144, and discharge flaps 145 for opening and closing the discharge ports 144 are each defined in the valve body 14. The reciprocation of each piston 36 draws refrigerant gas from the suction chamber 38 into the associated cylinder bore 122 through the associated suction ports 142 and suction flaps 143. The refrigerant gas in the cylinder bore 122 is compressed to a predetermined pressure by the reciprocating movement of the associated piston 36 and discharged into the discharge chamber 39 through the associated discharge port 144 and discharge flap 145.

The suction chamber 38 is connected to the accommodating bore 121 through an aperture 146. The abutment of the shutting surface 281 of the shutter 28 against the positioning surface 141 disconnects the aperture 146 from the suction passage 131. A conduit 46 extends along the axis of the rotary shaft 16. An inlet 461 of the conduit 46 opens in the crank chamber 15 in the vicinity of the sealing apparatus 21. An outlet 462 opens inside the shutter 28, which is in the suction pressure zone. A pressure releasing hole 282 extends through the wall of the shutter 28 and communicates the interior of the shutter 28 with the interior of the accommodating bore 121.

A pressurizing passage 48 connects the discharge chamber 39 with the crank chamber 15. A displacement control valve 49 is arranged in the pressurizing passage 48.

In the compressor of the above structure, the suction passage 131, through which refrigerant gas is drawn, and a discharge port 75, from which the refrigerant gas in the discharge chamber 39 is discharged, are connected by an external refrigerant circuit 76. A condenser 77, an expansion valve 78, and an evaporator 79 are provided in the external refrigerant circuit 76.

A temperature sensor 80 is arranged in the vicinity of the evaporator 79. The temperature sensor 80 detects the temperature of the evaporator 80 and sends detected temperature information to a control computer 81. The control valve 49 has a solenoid 491 that is actuated and de-actuated by the computer 81 based on the detected temperature information from the temperature sensor 80. When an air conditioner switch 82 is turned on, the computer 81 instructs the de-actuation of the solenoid 491 of the control valve 49 when the detected temperature becomes lower than a predetermined temperature. A temperature lower than the predetermined temperature indicates a state in which frost may form in the evaporator 79. When the air conditioner switch 82 is turned off, the computer 81 de-actuates the solenoid 491.

De-actuation of the solenoid 491 opens the pressurizing passage 48 and connects the discharge chamber 39 with the crank chamber 15. This communicates the high pressure refrigerant gas in the discharge chamber 39 with the crank chamber 15 through the pressurizing passage 48 and increases the pressure in the crank chamber 15. The pressure increase in the crank chamber 15 shifts the swash plate 23 toward the minimum inclination position.

When the shutting surface 281 of the shutter 28 abuts against the positioning surface 141, the cross-sectional passage area of the suction passage 131 becomes zero and the flow of refrigerant gas from the external refrigerant circuit 76 to the suction chamber 38 is impeded.

Since the minimum inclination of the swash plate 23 is not zero degrees, discharge from the cylinder bores 122 to the discharge chamber 39 takes place even when the swash plate inclination is minimum. The refrigerant gas in the suction chamber 38 is drawn into the cylinder bores 122 and discharged into the discharge chamber 39. In other words, when the swash plate inclination is minimum, a circulation passage is formed in the compressor extending through the discharge chamber 39, the pressurizing passage 48, the crank chamber 15, the conduit 46, the pressure releasing hole 282, the suction chamber 38, and the cylinder bores 122. Fluid moving together with the refrigerant gas (mainly lubricating oil) passes through the circulation passage to lubricate the interior of the compressor. There is a difference in pressure between the discharge chamber 39, the crank chamber 15, and the suction chamber 38. The pressure difference and the cross-sectional passage area of the pressure releasing hole 282 holds the swash plate 23 at the minimum inclination in a stable manner.

The actuation of the solenoid 491 closes the pressurizing passage 48 and the pressure in the crank chamber 15 is released through the conduit 46 and the pressure releasing hole 282. This decreases the pressure of the crank chamber 15. The pressure decrease shifts the swash plate 23 from the minimum inclination to the maximum inclination.

The sealing apparatus 21 will now be described.

Figure 2:
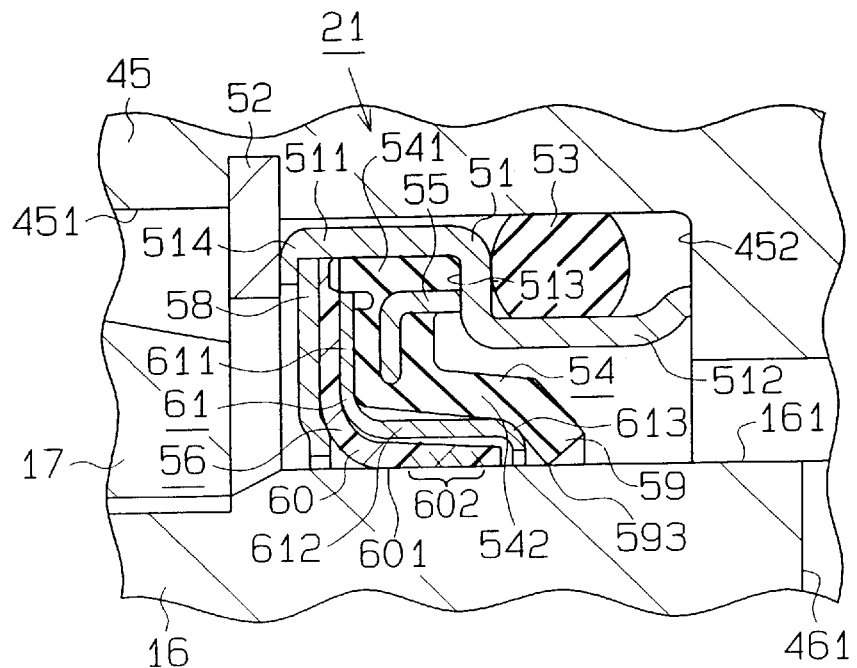
FIG. 2 is an enlarged partial cross-sectional view showing the vicinity of the sealing apparatus of FIG. 1.

As shown in FIG. 2, a case 51 includes a large cylindrical portion 511 and a small cylindrical portion 512. The case 51 is inserted into the boss 45. Movement of the case 51 toward the crank chamber 15 is restricted by the abutment of the distal end of the small cylindrical portion 512 against a stepped wall surface 452 defined in the rearward end of the boss 45. The movement of the case 51 toward the outside of the compressor is restricted by the abutment of the large cylindrical portion 511 against a snap ring 52 fitted into the inner surface 451 of the boss 45. An O-ring 53 is fitted onto the small cylindrical portion 512 and is in contact with the inner surface 451 of the boss 45.

A first lip ring 54, which is made of a synthetic resin such as acrylonitrile-butadiene rubber, is held by a first holding piece 55. A second lip ring 56, which is made of a fluororesin such as PTFE (polytetrafluoroethylene), is arranged at the front, or outer, side of the first lip ring 54. A posture maintaining ring 61, or posture maintaining member, is arranged between the first lip ring 54 and the second lip ring 56. A second holding piece 58 is arranged at the front, or outer, side of the second lip ring 56. These members 54–56, 58, 61 are accommodated in the case 51. In the case 51, the first holding piece 55 abuts against a stepped surface 513 connecting the large cylindrical portion 511 with the small cylindrical portion 512. The second holding piece 58 abuts against an end 514, which is bent radially inward, of the large cylindrical portion 511. Thus, the first lip ring 54, the second lip ring 56, and the posture maintaining ring 61 are held between the first holding piece 55 and a second holding piece 58.

Figure 4A:
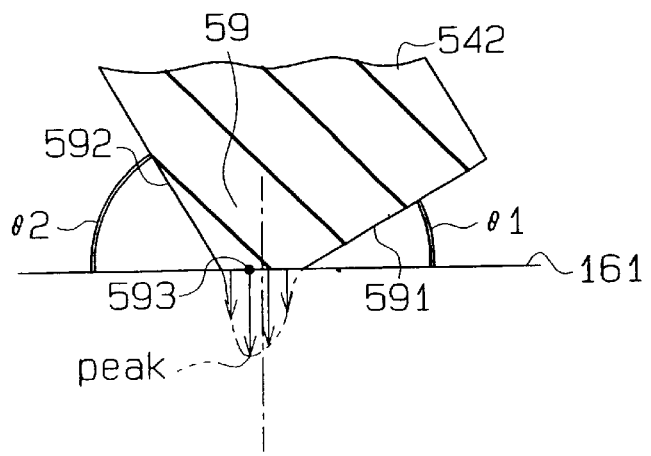
FIG. 4A is an enlarged cross-sectional diagram showing the flare of FIG. 2.

The first lip ring 54 has a peripheral sealing portion 541, which is in contact with the inner surface of the large cylindrical portion 511, and a lip portion 542, which is in contact with the outer surface 161 of the rotary shaft 16. The lip portion 542 extends through the interior of the case 51 toward the crank chamber 15. The distal end of the lip portion 542 is inclined radially downward. An acute flare 59 has an inclined surface 591 at the distal part of the lip as shown in FIG. 2 and FIG. 4A. The inner annular edge 593 of the flare 59 is in contact with the outer surface 161 of the rotary shaft 16 along an annular region.

FIG. 4A is an enlarged view of the vicinity of the flare 59 of FIG. 2. As shown in the drawing, the surface 591 defining the crank chamber side of the flare 59 is inclined with respect to the outer surface 161 of the rotary shaft 16 by a predetermined angle θ1. In the same manner, an inclined surface 592 defining the compressor exterior side of the flare 59 is inclined with respect to the outer surface 161 of the rotary shaft 16 by a predetermined angle θ2. The contacting posture of the lip portion 542 is arranged so that the angle θ1 between the inclined surface 591 and the outer surface 161 and the angle θ2 between the inclined surface 592 and the outer surface 161 satisfies the relationship of θ1<θ2. The lip portion 542 of the first lip ring 54 seals effectively when rotation of the rotary shaft 16 is stopped but permits leakage of fluid from the crank chamber 15 toward the second lip ring 56 during rotation of the rotary shaft 16.

Figure 4B:
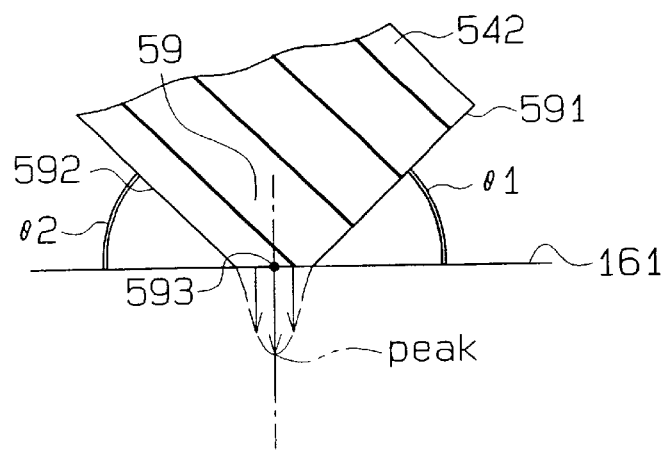
FIG. 4B is an enlarged cross-sectional diagram showing the flare of a sealing apparatus of a comparative example.
Figure 4C:
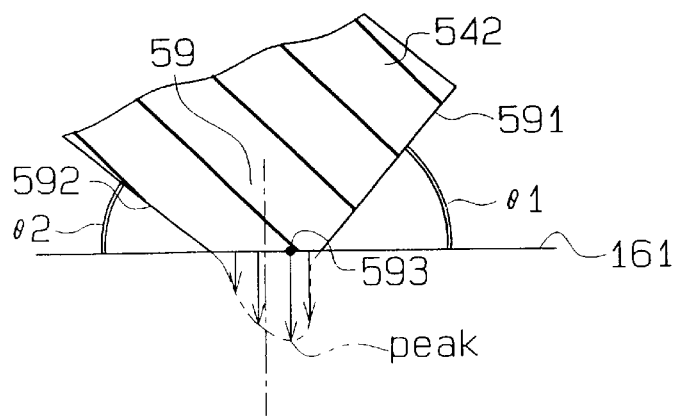
FIG. 4C is an enlarged cross-sectional diagram showing the flare of a sealing apparatus of another comparative example.

FIG. 4B shows a comparative example in which the contacting posture of the lip portion 542 with respect to the rotary shaft 16 satisfies the relationship of θ1=θ2. FIG. 4C shows a comparative example in which the contacting posture of the lip portion 542 with respect to the rotary shaft 16 satisfies the relationship of θ1>θ2. These comparative examples differ from the preferred embodiment in that fluid leakage from the crank chamber toward the second lip ring 56 is not permitted during rotation of the rotary shaft 16.

The difference between the preferred embodiment and the comparative examples will now be described. As shown in FIGS. 4A, 4B, and 4C, the flare 59 elastically contacts the outer surface 161 of the rotary shaft 16, with the vicinity of its inner annular edge 593 flattened. The portion of the flare 59 contacting the outer surface 161 of the rotary shaft 16 includes the inner annular edge 593 and has a certain sealing width (as measured in the axial direction of the shaft 16). The double-dotted curved lines of FIGS. 4A, 4B, 4C show the force distribution of the contact pressure of the flare 59 applied to the outer surface 161. As apparent from the distribution, if the contacting posture of the lip portion 542 with respect to the rotary shaft 16 satisfies the condition of θ1=θ2, the flare 59 is flattened so that the peak of the contact pressure, or the inner annular edge 593, is located at the center of the sealing width (indicated by the vertical broken line FIG. 4B) If the condition of θ1>θ2 is satisfied, the flare 59 is flattened with the inner annular edge 593 located at a position offset from the center (indicated by the vertical broken line in FIG. 4C) toward the crank chamber 15. If the condition of θ1<θ2 is satisfied, the flare 59 is flattened with its inner annular edge 593 located at a position offset from the center toward the pulley 17. In other words, it can be presumed that the sealing capability of the affected greatly by how the flare 59 is flattened.

Figure 3:
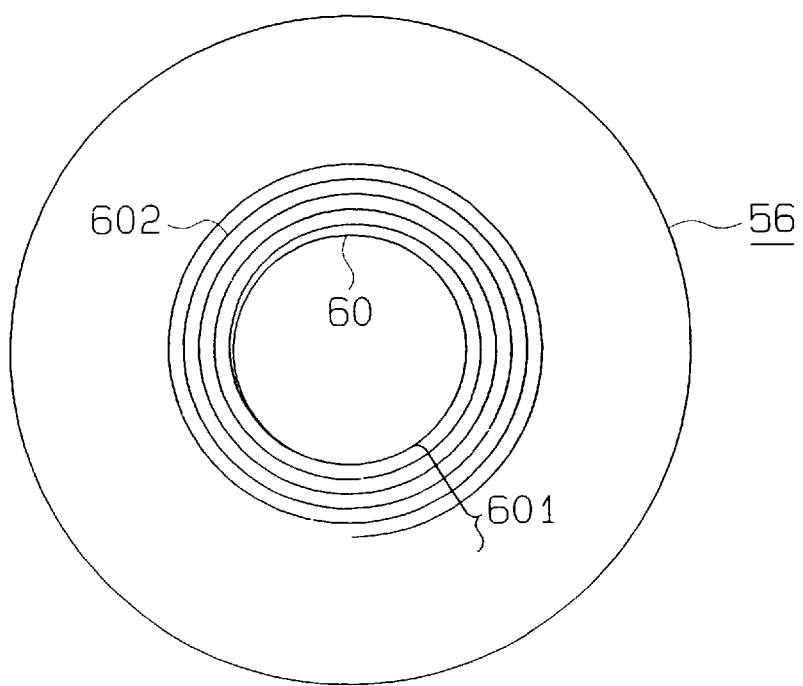
FIG. 3 is a plan view of a front, or outer, side of a second lip ring before the insertion of a rotary shaft.

FIG. 3 shows the second lip ring 56 before insertion of the rotary shaft 16. In this state, the second lip ring 56 is flat. As shown in FIG. 2, when the rotary shaft 16 is inserted, the inner portion of the second lip ring 56 is bent toward the crank chamber 15. The bent portion defines a lip portion 60. The lip portion 60 includes a seal surface 601 having a predetermined width (as measured in the axial direction of the shaft 16). The seal surface 601 contacts the outer surface 161 of the rotary shaft 16 along an annular region. Most of the lip portion 60 is included in the space between the lip portion 542 of the first lip ring 54 and the outer surface 161 of the rotary shaft 16. The overlapping of the lip portion 542 of the first lip ring 54 and the lip portion 60 of the second lip ring 56 reduces the size of the sealing apparatus 21 in the direction of the axis L.

A pump groove 602 extends spirally about the axis (L) of the second lip ring 56 in the seal surface 601 of the lip portion 60. Accordingly, a spiral pump structure actuated by the rotation of the rotary shaft 16 is defined by the pump groove 602 and the opposing outer surface 161 of the rotary shaft 16. The pump groove 602 is provided only at the crank chamber end of the seal surface 601 and not the compressor exterior end of the seal surface 601. That is, the groove 602 is not formed in the front end (the end nearest to the pulley 17) of the seal surface 601

The posture maintaining ring 61 has a peripheral portion 611 held between the first lip ring 54 and the second lip ring 56. The posture maintaining ring 61 also has an inner portion 612 that is bent to extend toward the crank chamber 15 to separate the lip portion 542 of the first lip ring 54 from the lip portion 60 of the second lip ring 56. A posture maintaining portion 613, which is curved radially inward, is defined at the distal or rearward portion of the inner portion 612. The posture maintaining portion 613 contacts the lip portion 542 of the first lip ring 54 to support the lip portion 542 from the side of the compressor exterior. The curved posture maintaining portion 613 enables low-pressure contact with the lip portion 542. As apparent from the drawing, a space is provided between the inner portion 612 of the posture maintaining ring 61 and the lip portion 60 of the second lip ring 56.

The operation of the sealing apparatus 21 will now be described.

When the engine 20 is stopped and the rotation of the rotary shaft 16 is stopped, the elasticity of the lip portion 542 of the first lip ring 54 causes the lip portion 542 to contact the outer surface 161 of the rotary shaft 16. Accordingly, the leakage of fluid (refrigerant or lubricating oil) from the crank chamber 15, which is inside the compressor, toward the exterior of the compressor is prevented.

However, as described above, the lip portion 542 of the first lip ring 54 is arranged so that it enables leakage of fluid toward the second lip ring 56 during rotation of the rotary shaft 16. Accordingly, when the engine 20 is started and the rotary shaft 16 is rotated, some fluid in the crank chamber 15 leaks from the lip portion 542 toward the second lip ring 56. However, the lip portion 60 of the second lip ring 56 seals in the fluid that leaks from the lip portion 542 and prevents the fluid from leaking out of the compressor. Relative rotation between the groove 602 and the outer surface 161 produces a pumping effect and positively returns the fluid to the crank chamber 15 through the pump groove 602. This enhances the sealing capability of the lip portion 60.

During rotation of the rotary shaft 16, the leakage of fluid from the lip portion 542 of the first lip ring 54 enables fluid (mainly lubricating oil) to lubricate the lip portion 542 of the first lip ring 54 and the lip portion 60 of the second lip ring 56. This prevents frictional deterioration and thermal deterioration of the lip portions 542, 60.

The following advantages are obtained from the structure of the preferred embodiment.

(1) During minimum inclination operation of the compressor, the high pressure refrigerant gas in the discharge chamber 39 may increase the pressure of the crank chamber 15 to, for example, about 7 kgf/cm²(gauge). The high pressure of the crank chamber 15 tends to deform the first lip ring 54. However, the lip portion 542 of the first lip ring 54 is supported by the posture maintaining portion 613 of the posture maintaining ring 61. This prevents deformation of the first lip ring 54. Therefore, the first lip ring 54 does not press the lip portion 60 of the second lip ring 56 against the outer surface 161 of the rotary shaft 16 with excessive force. As a result, excessive heating of the lip portion is avoided. This prevents heating of the lip portion 60, which is made of a synthetic rubber, which has a heat resistance that is inferior to fluororesin, and improves the durability of the sealing apparatus 21.

(2) The contacting posture of the lip portion 542 with respect to the rotary shaft 16 is arranged so that the angle θ1 between the inclined surface 591 and the outer surface 161 and the angle θ2 between the inclined surface 592 and the peripheral surface 161 satisfies the relationship of θ1<θ2. Accordingly, the lip portion 542 seals effectively when the rotation of the rotary shaft 16 is stopped while preventing a large amount of fluid leakage during rotation of the rotary shaft 16. This results in satisfactory lubrication of the lip portion 542 of the first lip ring 54. Thus, as marked by the squares in FIG. 5, the heating of the lip portion 542 is reduced in comparison with the sealing apparatus of Japanese Unexamined Patent Publication No. 6-300142 (marked by circles) under the same conditions.

(3) The pump groove 602 is defined in the lip portion 60 of the second lip ring 56. A spiral pumping effect is produced by the pump groove 602 and the outer surface 161 during rotation of the rotary shaft 16. Accordingly, the sealing performance of the lip portion 60 of the second lip ring 56 is improved. The improvement of the sealing performance of the lip portion 60 during rotation of the rotary shaft 16 prevents degradation of the sealing performance of the entire sealing apparatus 21, even if leakage of fluid from the lip portion 542 of the first lip ring 54 is permitted.

(4) The pump groove 602 is provided only at the crank chamber side of the seal surface 601 of the lip portion 60 and not the compressor exterior side of the seal surface 601. In other words, the pump groove 602 does not open toward the exterior of the compressor. Accordingly, in cases such as when the rotation of the rotary shaft 16 is stopped, the residual fluid in the pump groove 602 does not flow out of the compressor. This improves the sealing performance of the sealing apparatus 21 when the rotation of the rotary shaft 16 is stopped.

(5) The compressor of the preferred embodiment is a variable displacement compressor. Thus, displacement is varied by adjusting the pressure of the crank chamber 15. Accordingly, the pressure in the crank chamber 15 becomes high during minimum inclination operation. The advantages of the above sealing structure 21 are especially effective when applied to a variable displacement compressor that withstands such harsh conditions.

(6) Further to the above advantage (5), the compressor of the preferred embodiment is a clutchless compressor and the rotary shaft 16 is always rotated when the engine 20 is running. That is, the lip portion 542 of the first lip ring 54 always slides along the outer surface 161 of the rotary shaft 16 when the engine 20 is running. As described above, the pressure of the crank chamber 15 is high during minimum displacement operation. In addition, minimum displacement operation may be continued for a long period of time during the winter. The advantages of the above sealing structure 21 are especially effective when applied to a variable displacement compressor that withstands such harsh conditions.

(7) The inlet 461 of the conduit 46, which constitutes an internal circulation passage for fluid during minimum displacement operation, is located in the vicinity of the first lip ring 54 of the sealing apparatus 21. Accordingly, during minimum inclination operation, which produces a harsh environment for the sealing apparatus 21, there is an increase in the amount of fluid flowing in the vicinity of the first lip ring 54 in the crank chamber 15. As a result, the required amount of fluid necessary for lubricating the lip portion 542 leaks continuously. This further reduces heating of the lip portion 60.

Second Embodiment

Figure 6:
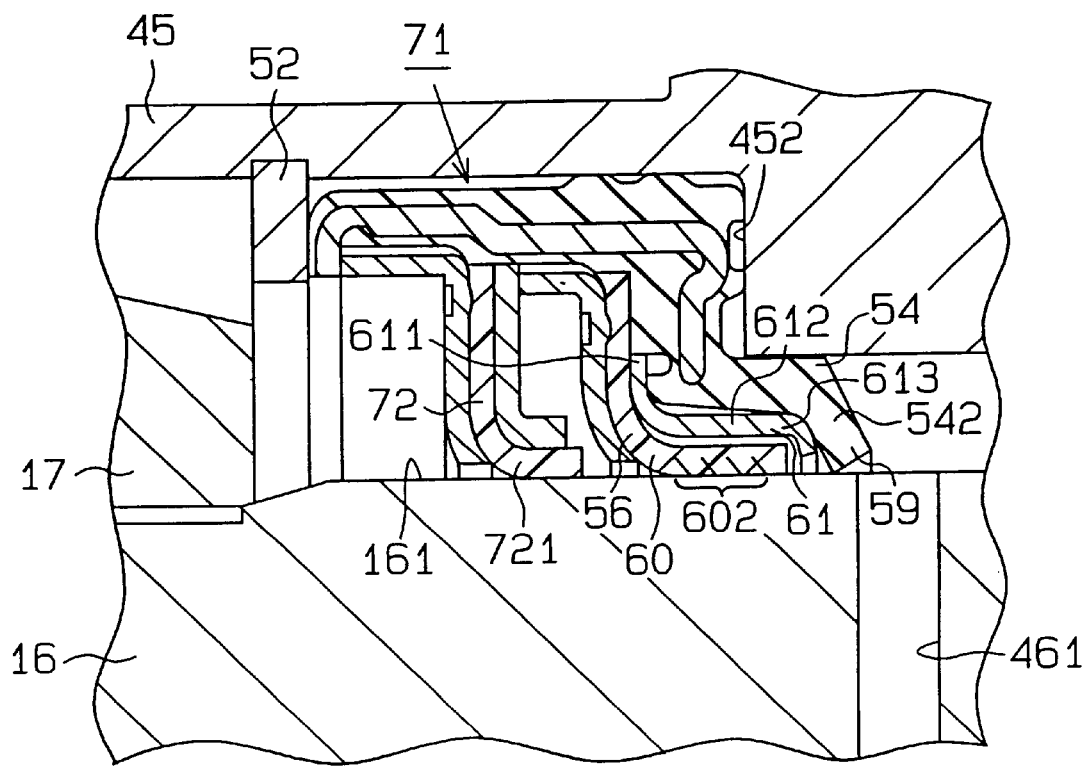
FIG. 6 is an enlarged partial cross-sectional view showing a second embodiment of a sealing apparatus according to the present invention.
Figure 7:
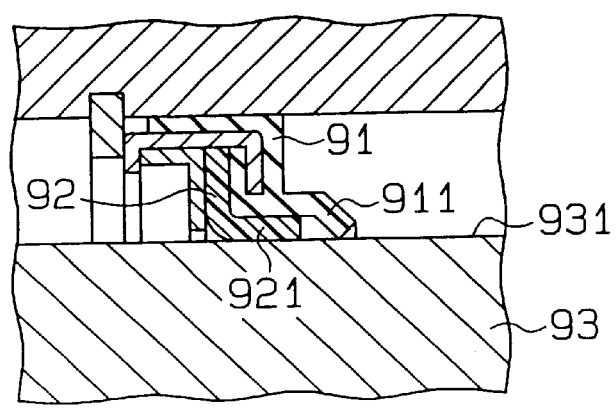
FIG. 7 is an enlarged partial cross-sectional view showing the sealing apparatus of Japanese Unexamined Patent Publication No. 6-300142.

FIG. 6 shows a second embodiment. In addition to the main sealing structure of the sealing apparatus 21 of the first embodiment, a sealing apparatus 71 of this embodiment includes a fluororesin third lip ring 72, the structure of which is similar to the second lip ring 56. The third lip ring 72 is arranged at the outer side of the second lip ring 56 and has a lip portion 721 that contacts the outer surface 161 of the rotary shaft 16. The lip portion 721 is not provided with the pump groove 602.

The following advantages are obtained from the structure of this embodiment.

(1) The sealing apparatus 71 has the third lip ring 72. Accordingly, if the second lip ring 56 deteriorates, the lip portion 721 of the third lip ring 72 functions as a further seal and prevents the fluid in the crank chamber 15 from leaking out of the compressor. This further improves the durability of the sealing apparatus 71.

(2) The lip portion 721 of the third lip ring 72 prevents dust or the like from entering the compressor. Accordingly, the lip portion 60 of the second lip ring 56 is not exposed to dust. This improves the sealing performance of the second lip ring 56 and enhances the sealing performance of the sealing apparatus 71.

The present invention may be embodied as described below without departing from the spirit or scope of the invention.

(1) In the above embodiments, the contacting posture of the lip portion 542 with respect to the rotary shaft 16 may be arranged as shown in FIG. 4B or FIG. 4C. Even if arranged in such manner, the supporting function of the posture maintaining ring 61 prevents the first lip ring 54 from pressing the lip portion 60 of the second lip ring 56 against the rotary shaft 16 while permitting a small amount of fluid to flow toward the second lip ring 56 during rotation of the rotary shaft 16. Thus, as marked by the triangles in FIG. 5, the heating of the lip portion 542 of the lip ring 56 is positively reduced in comparison with the sealing apparatus of Japanese Unexamined Patent Publication No. 6-300142 (marked by circles).

(2) In the above embodiments, the contacting posture of the lip portion 542 with respect to the rotary shaft 16 may be arranged so that fluid does not leak even when the rotary shaft 16 is rotating.

(3) The present embodiment may be applied to the sealing structure of a compressor employing a clutch.

What is claimed is:

1. A seal apparatus for a rotary shaft of a compressor, wherein the seal apparatus seals about the rotary shaft between a high pressure inner zone and a low pressure outer zone, and wherein fluid lubricant is located in the high pressure zone, the apparatus comprising:
    a first flexible ring having a first lip portion for contacting the surface of the rotary shaft, wherein the first ring has a low pressure side, which is exposed to a relatively low pressure, and a high pressure side, which is exposed to the high pressure zone;
    a second flexible ring located on the low pressure side of the first lip portion, wherein the second ring has a second lip portion that contacts the surface of the rotary shaft; and
    a support ring located between the first ring and the second ring, wherein the support ring supports the first lip and determines the position of the first lip with respect to the shaft.

2. The seal apparatus according to claim 1, wherein the first lip has an inner inclined surface extending from the surface of the shaft toward the high pressure zone and an outer inclined surface extending from the surface of the shaft toward the low pressure zone, wherein the angle between the surface of the shaft and the inner inclined surface is less than the angle between the outer inclined surface and the surface of the shaft, and wherein the structure and arrangement of the first lip permits leakage of fluid from the high pressure zone to the low pressure side of the first lip.

3. The seal apparatus according to claim 1, wherein the second lip is located within the support ring, and an annular space is formed between the second lip and the support ring.

4. The seal apparatus according to claim 1, wherein a pump structure is defined by the second lip and the surface of the shaft for forcing fluid lubricant from between the surface of the shaft and the second lip towards the first lip.

5. The seal apparatus according to claim 4, wherein the pump structure includes a spiral groove formed in one of the second lip and the surface of the shaft, and wherein the spiral groove is sealed from the low pressure zone by an annular portion of the second lip.

6. The seal apparatus according to claim 1, wherein the compressor includes:
    a crank chamber;
    a cam plate, which is inclinable with respect to the rotary shaft and which rotates integrally with the rotary shaft;
    a cylinder bore; and
    a piston located within the cylinder bore, wherein the piston is connected to the cam plate, and wherein the pressure in the crank chamber is varied to control the inclination of the cam plate and the displacement of the compressor.

7. The sealing apparatus according to claim 6, wherein a refrigeration circuit is attached to the compressor, and a power source is coupled to the rotary shaft with a clutchless transmission apparatus such that the compressor operates continuously when the power source operates.

8. The sealing apparatus according to claim 6, wherein the compressor includes a suction chamber and an internal passage for conducting fluid from the crank chamber toward a suction chamber, and wherein the internal passage has an inlet located in close proximity to the first lip.

9. The sealing apparatus according to claim 1, wherein the second ring is made of flouroresin.

10. A seal apparatus for a rotary shaft of a compressor, wherein the seal apparatus seals about the rotary shaft between a high pressure inner zone and a low pressure outer zone, and wherein fluid lubricant is located in the high pressure zone, the apparatus comprising:
    a first flexible ring having a first lip portion for contacting the surface of the rotary shaft, wherein the first ring has a low pressure side, which is exposed to a relatively low pressure and a high pressure side, which is exposed to the high pressure zone, wherein the first ring is constructed and arranged to permit leakage of fluid lubricant from the high pressure zone to the low pressure side;
    a second flexible ring located on the low pressure side of the first lip portion, wherein the second ring has a second lip portion that contacts the surface of the rotary shaft and wherein the second ring has a generally radially extending portion and an axially extending portion joined to the radially extending portion, wherein the axially extending portion forms the second lip; and
    a support ring located between the first ring and the second ring, wherein the support ring supports the first lip and fixes the position of the first lip with respect to the shaft.

11. The sealing apparatus according to claim 10, wherein the second ring is made of flouroresin.

12. The seal apparatus according to claim 10, wherein the first lip has an inner inclined surface extending from the surface of the shaft towards the high pressure zone and an outer inclined surface extending from the surface of the shaft towards the low pressure zone, wherein the angle between the surface of the shaft and the inner inclined surface is less than the angle between the outer inclined surface and the surface of the shaft.

13. The seal apparatus according to claim 12, wherein the second lip is located within the support ring, and an annular space is formed between the second lip and the support ring.

14. The seal apparatus according to claim 13, wherein a pump structure is defined by the second lip and the surface of the shaft for forcing fluid lubricant from between the surface of the shaft and the second lip towards the first lip.

15. The seal apparatus according to claim 14, wherein the pump structure includes a spiral groove formed in one of the second lip and the surface of the shaft, and wherein the spiral groove is sealed from the low pressure zone by an annular portion of the second lip.

16. A compressor having a seal apparatus, wherein the compressor includes:
    a housing;
    a crank chamber within the housing, wherein the interior of the crank chamber is a high pressure zone containing fluid lubricant;
    a rotary shaft extending from the outside of the compressor to the crank chamber;
    a cam plate, which is inclinable with respect to the rotary shaft and which rotates integrally with the rotary shaft;
    a cylinder bore;
    a piston located within the cylinder bore, wherein the piston is connected to the cam plate, and wherein the pressure in the crank chamber is varied to control the inclination of the cam plate and the displacement of the compressor, wherein the seal apparatus comprises:

a first flexible ring attached to the housing, the first flexible ring having a first lip portion for contacting the surface of the rotary shaft, wherein the first lip portion extends axially toward the crank chamber, and wherein the first ring has a low pressure side, which is exposed to a relatively low pressure, and a high pressure side, which is exposed to the high pressure zone;

a second flexible ring located on the low pressure side of the first lip portion, wherein the second ring is attached to the housing and has a second lip portion that contacts the surface of the rotary shaft, and wherein the second lip portion extends axially toward the crank chamber; and a support ring located between the first ring and the second ring, wherein the support ring supports the first lip and fixes the position of the first lip with respect to the shaft, wherein the support ring has a portion that extends axially toward the crank chamber.

17. The compressor according to claim 16, wherein the first lip has an inner inclined surface extending from the surface of the shaft towards the high pressure zone and an outer inclined surface extending from the surface of the shaft towards the low pressure zone, wherein the angle between the surface of the shaft and the inner inclined surface is less than the angle between the outer inclined surface and the surface of the shaft.

18. The compressor according to claim 16, wherein the second lip is located within the support ring, and an annular space is formed between the second lip and the support ring.

19. The compressor according to claim 16, wherein a pump structure is defined by the second lip and the surface of the shaft for forcing fluid lubricant from between the surface of the shaft and the second lip towards the first lip.

20. The compressor according to claim 19, wherein the pump structure includes a spiral groove formed in one of the second lip and the surface of the shaft, and wherein the spiral groove is sealed from the low pressure zone by an annular portion of the second lip.

21. The compressor according to claim 16, wherein a refrigeration circuit is attached to the compressor, and a power source is coupled to the rotary shaft with a clutchless transmission apparatus such that the compressor operates continuously when the power source operates.

22. The compressor according to claim 16, wherein the compressor includes a suction chamber and an internal passage for conducting fluid from the crank chamber toward a suction chamber, and wherein the internal passage has an inlet located in close proximity to the first lip portion.

* * * * *

UNITED STATES PATENT AND TRADEMARK OFFICE
CERTIFICATE OF CORRECTION

PATENT NO. : 6,123,514
DATED : September 26, 2000
INVENTOR(S) : Masahiro Kawaguchi et al.

It is certified that error appears in the above-identified patent and that said Letters Patent is hereby corrected as shown below:

Title page,
Item [73], Assignee, please change "Seisakushi" to -- Seisakusho --

Column 7,
Line 21, please change "downward" to -- inward --
Line 27, please change "the surface" to -- the inclined surface --

Column 8,
Line 7, please change "of the affected" to -- of the lip portion 542 during rotation of the rotary shaft 16 is affected --
Line 42, please change "distal or rearward" to -- distal, or rearward, --

Column 12,
Lines 7 and 34, please change "flouroresin" to -- fluororesin --
Line 15, please change "low pressure and" to -- low pressure, and --

Signed and Sealed this

Ninth Day of September, 2003

JAMES E. ROGAN
*Director of the United States Patent and Trademark Office*